United States Patent
Thorvaldsen

[11] 4,222,194
[45] Sep. 16, 1980

[54] BOB FOR CAST FISHING

[76] Inventor: Sverre Thorvaldsen, Hageveien, Bede, 1700 Sarpsborg, Norway

[21] Appl. No.: 958,682

[22] Filed: Nov. 8, 1978

[30] Foreign Application Priority Data

Nov. 11, 1977 [NO] Norway ............................. 773865

[51] Int. Cl.$^3$ ............................................. A01K 97/04
[52] U.S. Cl. ...................................................... 43/41.2
[58] Field of Search .......................................... 43/41.2

[56] References Cited

U.S. PATENT DOCUMENTS

| | | | |
|---|---|---|---|
| 2,292,743 | 8/1942 | Cordry | 43/41.2 |
| 2,910,798 | 11/1959 | Bias | 43/41.2 |
| 3,084,467 | 4/1963 | Bromwell | 43/41.2 |
| 3,163,957 | 1/1965 | Barrett | 43/41.2 |
| 3,292,296 | 12/1966 | Viveiros | 43/41.2 |
| 3,303,596 | 2/1967 | Lewis et al. | 43/41.2 |
| 3,537,206 | 11/1970 | Pool | 43/41.2 |
| 3,686,787 | 8/1972 | Milovich | 43/41.2 |

FOREIGN PATENT DOCUMENTS

| | | | |
|---|---|---|---|
| 103026 | 10/1963 | Norway | 43/41.2 |
| 166487 | 3/1959 | Sweden | 43/41.2 |

*Primary Examiner*—Othell M. Simpson
*Assistant Examiner*—J. T. Zatarga
*Attorney, Agent, or Firm*—Cushman, Darby & Cushman

[57] ABSTRACT

A cast fishing implement comprising a line a leader or snell, a hook device, a sinker attached to the line, and a bob consisting of a float body, with a weight at the forward end thereof, e.g. a lead ring. The bob is provided with a central cavity which is outwardly open at one end thereof and which at the opposite end terminates in an elongated channel inside a straight, rod-shaped extension rearward of the float body. The cavity is dimensioned such that it can contain the hook with the bait, spinner or the like, and said channel being dimensioned such that it can contain the sinker. The bob is adapted to lie flat on the surface of the water when the sinker is drawn all the way in to the end of the channel in the extension and the hook with the bait, spinner or the like lie within the cavity. The bob is balanced such that its center of gravity lies near the forward end of the bob, permitting it to stand upright when the hook, spinner or the like and the sinker have left the bob. The overall length of the hook, intermediate leader and sinker is adapted to correspond to the overall length of the cavity and the channel in the extension for the bob.

7 Claims, 5 Drawing Figures

BOB FOR CAST FISHING

The present invention pertains to an improved cast fishing implement comprising a line, a leader or snell, a hook device (e.g., a hook with bait, a spinner or the like), a sinker attached to the line, and a bob consisting of a float body with a weight at the forward end thereof (e.g., a lead ring) and provided with a central cavity which is outwardly open at one end and which at the other end terminates in an elongated channel formed in a straight, rod-shaped extension of the rearward end of the float body, the dimensions of said cavity being adapted to contain the hook with bait, the spinner or the like, and the shape and dimensions of said channel being adapted to contain the sinker.

Such a fishing implement is disclosed in U.S. Pat. No. 3,292,296. In this patent specification, the implement comprises an arrow to be shot forth from a bow. The disadvantage of the patented implement is that the float gives no indication as to whether the hook and sinker have left the float or not. The bob or float will in all circumstances lie flat on the water and one is thus unable to ascertain if the implement is in a position to fish or not.

Norwegian Pat. No. 92.319 discloses a casting bob having a cavity which holds the hook device and sinker during the cast. This float will in all circumstances stand upright in the water, whether the hook and sinker have left the float or not. The same is true of a device shown in German Pat. No. 848.584.

The purpose of the present invention is to improve upon the previously known floats of this type. This is obtained by an improved fishing implement of the type specified introductorily, which is characterized in that the float is balanced such that its center of gravity lies near the forward end of the bob, permitting it to stand upright on the surface of the water when the hook, spinner or the like and the sinker have left the float, and in that the overall length of the hook, leader and sinker is adapted to conform to the overall length of the float cavity and the channel in the extension thereof.

When fishing, the float is used as follows: The hook with bait or a spinner and the sinker are pulled back into the bob, the length of the snell or leader being adapted such that the sinker will be positioned at the back of the channel in the float extension and the hook will lie within the float cavity. The bob is then cast by means of a casting implement, e.g., a casting rod, or simply thrown out by hand, the rest of the line being wound onto a simple casting reel held in the fisherman's other hand. When the bob reaches the surface of the water, the hook, bait and sinker will be pushed out of the cavity in the float and begin to sink. The correct depth of the line for fishing is set in the normal way by placing a knot or bead on the line at a suitable distance from the float. The hook or spinner will then sink down to the depth determined by the bead or knot, which checks the further passage of the line through the small hole in the end wall of the extension. The float will bob up into an upright position in the water owing to the location of its center of gravity. If the hook and sinker for some reason fail to leave the float, however, the bob will not stand upright, because the weight of the sinker at the back of the extension will cause the float to lie flat on the water, thus providing a clear indication to the angler that the fishing implement is inoperative. One can then try to dislodge the hook and sinker from the float by a quick jerk of the line. If this fails to raise the bob, the float will have to be reeled in and the error corrected.

One embodiment of the invention is characterized in that the float body is made of plastic foam and that the extension comprises a tubular member which is molded into the float body.

A second practical embodiment is characterized in that the float body and extension are molded as one piece, preferably of hard plastic foam.

The invention will be further elucidated in the following with reference to the accompanying drawings.

FIG. 3 shows the bob just after it has arrived at the surface of the water, and

FIG. 4 shows the bob as it is being reeled in.

FIG. 5 shows a second embodiment of the bob according to the invention.

Figure 1:
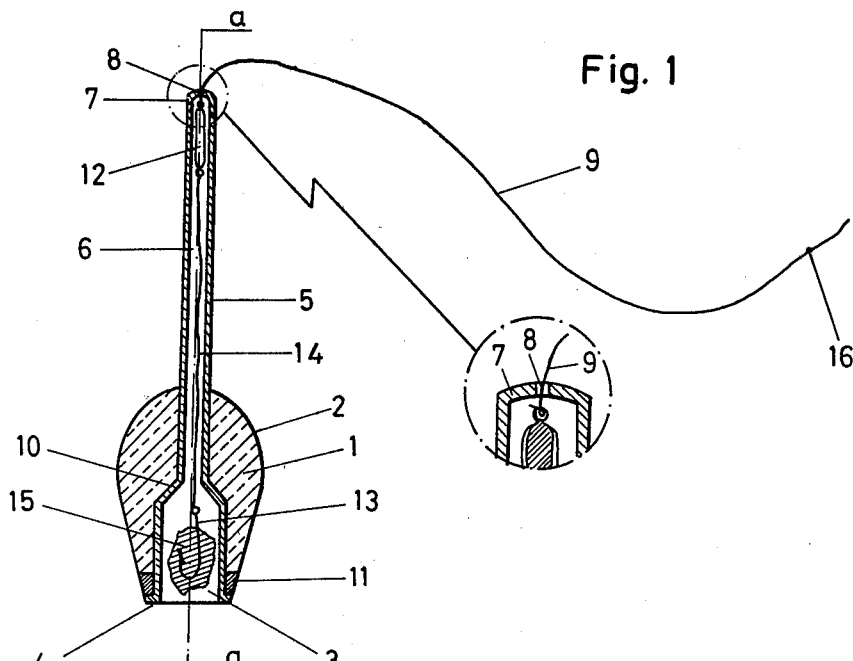
FIG. 1 shows an embodiment of a bob according to the invention, seen in cross section.

The casting bob consists of a float body 1, e.g., molded of polyurethane foam and having a sealed outer membrane 2. The float is a rotational body, and concentric with its axis a. there is a central cavity 3 which is open out toward the forward end 4 of the bob. At the opposite end of the bob is a narrow extension 5 which is also concentric about the axis a. The extension 5 is hollow, such that the central cavity 3 continues backwards into the channel 6 inside the extension 5. The channel 6 is closed at the back by means of an end wall 7 which has a small central opening 8 for the fishing line 9. As can be seen on the drawing, the channel 6 has a smaller cross section than the central cavity 3, and the two chambers are connected via a conical transition section 10. The extension 5, the transition section 10 and the walls of the central cavity 3 can be molded as one unit, preferably from a tough type of plastic. A ring 11 of metal, preferably lead, is attached to the forward edge of the bob to weight it in this area.

The line 9, as mentioned above, passes through the hole 8 in the end wall into the channel 6. Attached to the line is a sinker 12 which is connected to a hook 13 via a leader or snell 14. The length of the leader is adapted such that when the sinker 12 is drawn into the channel and abuts against the end wall 7, the hook will lie approximately in the middle of the central cavity 3. During use, bait 15 is attached to the hook. To set the line at a suitable fishing depth, a barrier, e.g., a knot 16, is placed in the line above the bob. The hook with the bait and sinker will then sink down through the water until the knot 16 reaches the end wall 7 and checks further descent, the knot being made so large that it cannot pass through the hole 8.

Figure 2:
FIG. 2 shows the bob as it is being cast.

FIG. 2 shows the orientation of the bob as it is being cast through the air.

Figures 3, 4, 5:
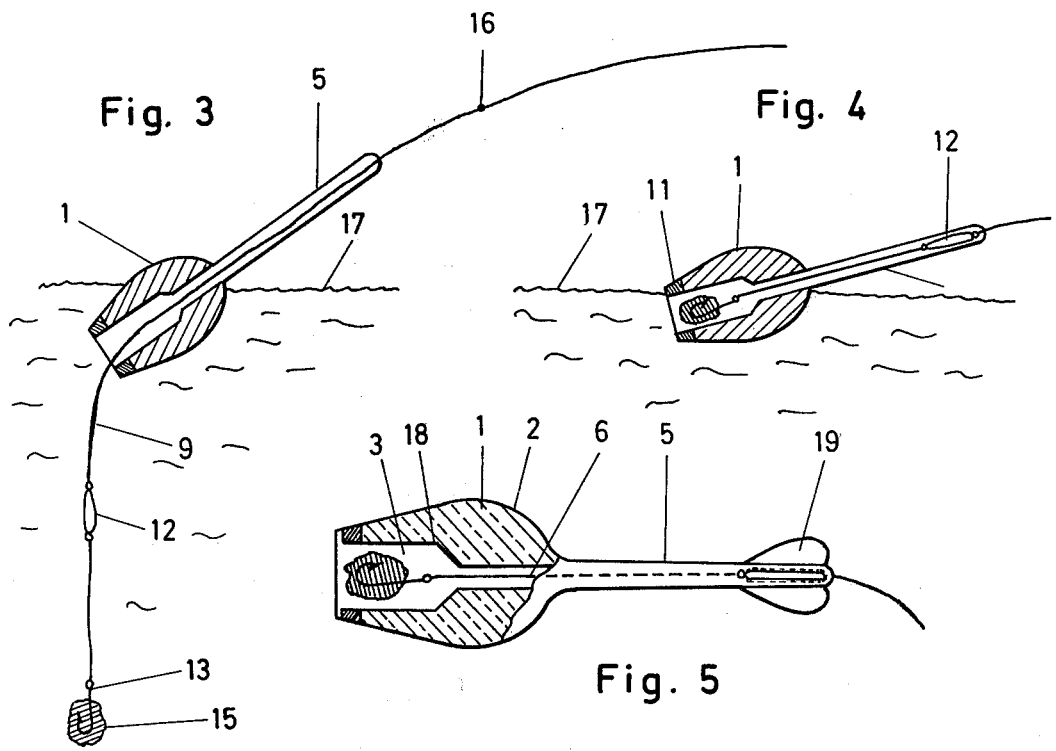

On FIG. 3, the bob has just arrived at the surface of the water 17. The sinker 12, hook 13 and bait 15 have left the bob and pull the line 9 through the float until the knot 16 checks any further descent.

FIG. 4 shows the bob as the line is being reeled in, with the sinker 12, hook 13 and bait 15 once again drawn up into the cavity inside the float. As one will note, the bob has a fairly horizontal orientation. It will remain in this position even if the line is slackened, because the sinker 12 counterbalances the weight of the lead ring 11. This design provides several advantages. Firstly, the bob clearly indicates if the sinker and hook have left the float, as it will then rise into a vertical position. In addition, it is an advantage when the line is being reeled in that the bob has a fairly horizontal orientation on the water, because the sinker, hook and bait will not then leave the bob unless the line is powerfully jerked. This would of course cause the bob to rise, and the sinker, hook and bait would once again leave the float. Normally, however, one can free the line of jellyfisk, sea grass, oil pollutants and the like as the line is being reeled in without risking that the bob will rise up and release the sinker and hook, which might in that case become snagged on the bottom if the bob has been brought into shallow waters as the line is reeled in.

FIG. 5 shows a second embodiment of the bob, where the float 1 and extension 5 have been molded as one piece. The bob can be made of hard plastic foam with a sealed outer surface 2 and a sealed inner surface 18 in the central cavity 3 and channel 6. The end of the extension 5 can be provided with external, molded stabilizer fins 19, as known per se, to increase control of the bob during casting (FIG. 2).

Practical experiments have shown that the bob of the invention can be cast up to one-third farther than previously known bobs, using the same casting equipment.

The invention should not be construed as being restricted to the embodiments as described above and illustrated in the drawings, as it could have a number of different outer configurations which would nevertheless remain within the scope of the present invention.

Having described my invention, I claim:

1. An improved cast fishing implement comprising a line, a sinker attached to the line, hook means attached to and spaced from the sinker, and an elongated buoyant bob having a hollow body at its forward end and a rod shaped extension extending rearwardly from said body, said body having a cavity which is open to receive said hook means and sinker and said extension having an interior longitudinal channel communicating with said cavity, said channel having a transverse dimension large enough to receive said sinker and the outer end of said extension having an opening therethrough communicating with said channel, said line passing through said opening and said opening having a size preventing passage of said sinker, said bob by itself having a center of gravity located sufficiently near the forward end of said bob that said bob will float in an upright position when said bob is free of said hook means and said sinker, and the collective center of gravity of said bob when said sinker is located in said channel near the outer end thereof being located such that said bob will float in a position more nearly horizontal than said upright position.

2. A fishing implement as in claim 1 wherein said bob includes a weight located near the forward end of said bob, said weight being effective to ensure that the center of gravity of said bob is located so that said bob by itself will float in an upright position.

3. A fishing implement as in claim 1 wherein said body is made of plastic foam and wherein said extension is a tubular body which is molded into said body.

4. A fishing implement as in claim 1 wherein said body and extension are molded as one integral unit from hard plastic foam.

5. A fishing implement comprising: a fishing line to which is attached hook means and sinker means; and an elongated hollow buoyant bob which is open at its forward end to receive said hook means and sinker means and which has an opening at its rearward end through which said line passes, the size of said opening being sufficiently small to prevent passage of said hook means and sinker means, said bob having a center of gravity located sufficiently far forward that said bob will float in an upright position when said hook means and sinker means lie outside said bob and the assembly of bob, hook means and sinker means having a center of gravity located such that said assembly will float in a position more nearly horizontal than said upright position when said hook means and sinker means are disposed inside said bob with said sinker means located near said opening.

6. A fishing implement as in claim 5 wherein said bob includes a weight located near the forward end of said bob, said weight being effective to ensure that the center of gravity of said bob is located so that said bob by itself will float in an upright position.

7. A fishing implement as in claim 5 wherein said bob includes a forward body having a cavity and a hollow rearwardly extending tubular extension of lesser transverse crosssection than said body, and wherein said hook means and sinker means are arranged such that when said sinker means resides in said extension near the rear end thereof said hook means resides in said cavity.

* * * * *